US007779575B2

(12) United States Patent
Hirafuji et al.

(10) Patent No.: US 7,779,575 B2
(45) Date of Patent: Aug. 24, 2010

(54) PULSE CONTAINER FOR AN INSECT ELECTROCUTOR

(75) Inventors: Masayuki Hirafuji, Ibaraki (JP); Hideo Yoichi, Ibaraki (JP)

(73) Assignee: National Agriculture and Food Research Organization (JP)

( * ) Notice: Subject to any disclaimer, the term of this patent is extended or adjusted under 35 U.S.C. 154(b) by 158 days.

(21) Appl. No.: 12/013,343

(22) Filed: Jan. 11, 2008

(65) Prior Publication Data

US 2008/0181352 A1 Jul. 31, 2008

(30) Foreign Application Priority Data

Jan. 12, 2007 (JP) ............................. 2007-004265

(51) Int. Cl.
*A01M 1/22* (2006.01)
(52) U.S. Cl. ........................................................ 43/112
(58) Field of Classification Search ................... 43/112, 43/58, 124
See application file for complete search history.

(56) References Cited

U.S. PATENT DOCUMENTS

| | | | | |
|---|---|---|---|---|
| 4,179,839 | A * | 12/1979 | Salotti et al. | 43/112 |
| 5,592,774 | A * | 1/1997 | Galyon | 43/124 |
| 5,815,090 | A * | 9/1998 | Su | 340/870.16 |
| 5,877,422 | A * | 3/1999 | Otomo | 73/587 |
| 6,052,066 | A * | 4/2000 | Su | 340/870.16 |
| 6,519,901 | B1 * | 2/2003 | Nelson et al. | 52/101 |
| 6,724,312 | B1 * | 4/2004 | Barber et al. | 340/573.2 |
| 7,020,996 | B2 * | 4/2006 | Beroza et al. | 43/124 |
| 7,057,516 | B2 * | 6/2006 | Donskoy et al. | 340/573.1 |
| 7,317,399 | B2 * | 1/2008 | Chyun | 340/573.1 |
| 2001/0033230 | A1 * | 10/2001 | Barber et al. | 340/573.2 |
| 2003/0146840 | A1 * | 8/2003 | Donskoy et al. | 340/573.2 |
| 2003/0160699 | A1 * | 8/2003 | Trompen | 340/573.2 |
| 2003/0218543 | A1 * | 11/2003 | Gardner et al. | 340/573.2 |
| 2006/0150470 | A1 * | 7/2006 | Ronnau | 43/58 |
| 2006/0261188 | A1 * | 11/2006 | Ito et al. | 239/306 |
| 2008/0204252 | A1 * | 8/2008 | Tolley et al. | 340/573.2 |

FOREIGN PATENT DOCUMENTS

JP 2000-000050 1/2000

* cited by examiner

*Primary Examiner*—Timothy D Collins
*Assistant Examiner*—Valentina Xavier
(74) *Attorney, Agent, or Firm*—Lowe Hauptman Ham & Berner, LLP

(57) ABSTRACT

An electric pulse counter for counting and recording the number of insects killed in a commercial insect electrocutor through an on-site field server is disclosed. The pulse counter is configured of field servers 100, an internet 40, an administrative computer 60, and user terminals 50. An insect electrocutor 20 is positioned near each of the field servers 100 for attracting insects present in the agricultural region and killing them by electrical discharge. An electromagnetic detection coil 10 is disposed above or around the insect electrocutor 20 for detecting changes in the electromagnetic field caused by such electrical discharges. An AC signal converter circuit 30 is disposed in each field server 100 and connected to the lead wire of the corresponding electromagnetic detection coil 10 for generating a digital count pulse from the signal outputted by the electromagnetic detection coil 10. The count pulse is accumulated in a storage unit 4 in the field server and the accumulated value is transmitted to the administrative computer 60 in response to a request therefrom. The administrative computer 60 functions as a Web server to provide this data to users via the Internet.

9 Claims, 4 Drawing Sheets

3 a : pulse number storing function
3 b : pulse data transmitting function
3 c : pulse resetting function
3 d : count parameter modifying function AC signal converter circuit (a) A plurality of counter modules (b) A plurality of counter modules Examples of counter modules integrated vertically (a) and circumferentially (b) about center pole

PULSE CONTAINER FOR AN INSECT ELECTROCUTOR

RELATED APPLICATIONS

The present application is based on, and claims priority from, Japanese Application Number 2007-004265, filed Jan. 12, 2007, the disclosure of which is hereby incorporated by reference herein in its entirety.

BACKGROUND OF THE INVENTION

1. Field of the Invention

The present invention relates to a pulse counter for counting and recording the number of insects killed in an insect-electrocuting apparatus by detecting the number of electric pulses generated in the apparatus in order to predict outbreaks of agricultural pests.

2. Description of the Related Art

It is desirable to count populations of harmful insects in agricultural regions in real time in order to predict outbreaks of agricultural pests and thereby prevent crop damage by such pests. Due to their large size and costliness, existing apparatuses for counting harmful insects are difficult to install and have been limited to use by research institutes and government agencies.

Apparatuses using light to attract insects and electric shock to kill them have been widely used. Since these insect electrocuting apparatuses are inexpensive, the entire apparatus can be replaced if a malfunction occurs. However, the apparatuses are unable to count and display the number of harmful insects killed.

One such apparatus that has been proposed in Japanese unexamined patent application publication No. 2000-50 (see pages 2 and 3 and FIG. 1) and marketed under the product name Mushidasu (a registered trademark of Elm Co., Ltd.) employs a method of selectively counting a specific type of insect. This apparatus attracts the specific type of insect with a pheromone and mechanically or electrically counts the number of insects as the insects are killed with a high-voltage electric shock or mechanical pressure.

However, this apparatus is a mechanically ambitious product and is costly to manufacture. Although the apparatus has good counting precision, the mechanism needed to count insects reliably is complex and expensive and not suited to a compact design. The apparatus is also unable to collect and distribute data via the Internet. Further, maintenance can be cumbersome if the interior of the apparatus becomes clogged with insects or in the event of another malfunction. Further, since a cell phone is used to transmit insect counts to remote locations, operating costs that include monthly telephone charges are considerable.

On the other hand, the common insect electrocuting apparatus, while inexpensive, cannot count the number of insects that are killed and, hence, cannot transmit such count data to remote locations.

It is possible to count electric pulses in a commercial insect electrocuting apparatus accurately by dismantling the apparatus and connecting a cable to the high-voltage unit in order to measure the current directly. However, this process involves many problems, including additional costs to the user for dismantling the apparatus and connecting a counting circuit, added noise in the counting circuit, and the danger of electrocution to the user.

Further, when using a conventional device for counting insects, a large number of personnel are needed for verifying that the device is counting accurately and for correcting incorrect counts. Moreover, the workers must travel to the site and conduct observations over a long period of time. The cost required for this work can be excessive when the devices are installed at numerous locations, and particularly when the distance to the installation points is great.

Further, the appearance and migration of insects is greatly affected by many environmental factors, such as atmospheric temperature, soil moisture, and wind. Hence, it is essential to measure such environmental data at numerous locations while simultaneously counting insects in order to analyze and elucidate the emergence and extermination states of the insects. Conventionally, insect counting and environmental measurements have been performed independently as it is difficult to perform both simultaneously in real time.

SUMMARY OF THE INVENTION

In view of the foregoing, it is an object of the present invention to provide a pulse counter for counting electric pulses transmitted via field servers installed on agricultural lands from common inexpensive insect electrocuting apparatuses that are commercially available as devices for attracting and killing insects.

This object will be attained with an electric pulse counter employing a field server according to the present invention. The field server comprises at least an environment measuring unit for measuring environmental factors in an agricultural region; an interface unit for interfacing with the environment measuring unit; a central controller comprising a microcomputer for reading measurements from the environment measuring unit via the interface unit; a storage unit for storing the measurements; a Web server; a wireless LAN transceiver; and a solar cell or commercial power supply input terminal. The electric pulse counter comprises an insect electrocutor having electrodes to which a high voltage is applied and provided in an agricultural region for attracting insects present in the agricultural region between the electrodes and killing the insects with sparks generated by electrical discharge between the electrodes when the insects enter a gap between the electrodes; an electromagnetic detection coil disposed near the insect electrocutor for detecting an electromagnetic field radiated by the spark produced from electrical discharge; and an AC signal converter circuit connected to a lead wire of the electromagnetic detection coil for amplifying a high-frequency voltage produced by excitation in the electromagnetic field detection coil, producing a count pulse by converting the high-frequency voltage to a digital signal and filtering noise therefrom, and outputting the count pulse to the interface unit of the field server. The central controller comprises at least count pulse number storing means for reading an output signal from the AC signal converter circuit converted to the count pulse via the interface unit beginning from a prescribed accumulation start time and recording the number of count pulses within a prescribed interval in the storage unit for each interval; count pulse data transmitting means for transmitting an accumulated value of count pulses and starting and ending times of the prescribed interval stored in the storage unit when a count pulse transmission request command is received from an administrative computer via the Web server in the field server; and count pulse resetting means for resetting the accumulated value of count pulses stored in the storage unit to zero and recording a new accumulation start time in the storage unit when a count pulse reset command is received from the administrative computer.

Further, the central controller further comprises count parameter modifying means for modifying a condition for filtering pulse noise, a time interval for accumulating a number of pulses, and other conditions when a parameter modification command is received from the administrative computer for updating parameters for the AC signal converter circuit or the count pulse number storing means.

Further, the insect electrocutor comprises an insect attracting unit for emitting a pheromone to attract specific insects present in an agricultural region or an attractant gas such as carbon dioxide for attracting mosquitoes or other specific insects; for turning on or flashing light having a specific wavelength; or for outputting ultrasonic waves or sound of another frequency; and counts the number of the specific insects captured.

Further, the insect electrocutor is a counter module for preventing insects other than the specific insects targeted for attraction from entering the counter module, the insect electrocutor comprising a rainproof case having a plurality of small holes through which the attracted insects can enter the counter module; and, provided in the case, an insect attracting unit; electrodes to which a high voltage is applied; and an electromagnetic detection coil for detecting an electromagnetic field radiated by a spark produced from electrical discharge between the electrodes.

The electric pulse counter employing a field server further comprises a fan built into the field server or attached to the counter module for introducing air into the case of the counter module and producing airflows through the counter module and exiting the small holes formed therein for actively carrying molecules of the pheromone or attractant gas produced by the insect attracting unit out of the counter module to encourage insect attraction. The fan rotation is temporarily accelerated to increase the rate of airflow for discharging insects from the insect electrocutor that have been seared by electrical shock and caked on the surfaces of the electrodes or insect remains and dust accumulating on the insect attracting unit and on the inner bottom surface of the counter module. The airflows produced by the fan also functioning to prevent rain from entering the counter module, preventing short circuits caused by raindrops from occurring in the insect electrocutor.

Further, the electric pulse counter integrally comprising a plurality of the counter modules. The insect attracting unit of each counter module has a different type of pheromone, or a source of gas such as carbon dioxide, or a light source producing light of a different specific wavelength such as yellow light, green light, and the like. The pulse counter functions to count the number of captured insects simultaneously for a plurality of types of insects.

Further, the field server comprises at least one serial communication port. The interface unit in the field server employs RS-232C, 12C or a similar serial communication method. The counter modules and a GPS instrument or other measuring instrument equipped with a serial communication port are connected to the serial communication port of the field server in parallel or through a connection switch. The field server transmits commands to the counter modules and the measuring instruments to control the counter modules and measuring instruments and to acquire an electric pulse count from the counter modules and data from the other measuring instruments.

Further, a small camera capable of communicating with the field server is provided in the insect electrocutor for taking images of electrocuted insects that have accumulated on the inner bottom surface of the counter module or on the surfaces of the electrodes to aid in monitoring the numbers and types of insects that have been killed in order to confirm, correct, or compensate for the precision of pulse counts measured with the electric pulse counter.

Further, the electric pulse counter employing a field server simultaneously measures numbers of targeted insects and environmental conditions including temperature, humidity, solar radiation, carbon dioxide levels, soil moisture and temperature, and wind; simultaneously displays this data together with conditions used for attracting insects, including the type of pheromone, light wavelengths and flashing conditions, and sound frequencies, on a Web page using maps, graphs, or charts; and publishes this data on the Web page through the Internet.

By using a coil to detect an electromagnetic field generated near the insect electrocutor by a spark therein, the system of the present invention can reliably count electric pulses easily and inexpensively, without the costs and danger associated with directly connecting a counter to a high-voltage current in the insect electrocutor.

The system can be implemented simply by providing the electromagnetic field coil and AC signal converter circuit near the insect electrocutor disposed in the agricultural region. Using the wireless LAN function of the field server to connect to the Internet, the system can collect such environmental data as temperature, humidity, solar radiation, and soil moisture measured by various sensors provided in the field server from remote locations in real time and can provide this data in response to queries from agricultural administrators or researchers by storing the data as time series data in a remote server, enabling the administrators or researchers to scientifically predict outbreaks of insects based on the environmental data and analyses on the relationships between environmental conditions and insect outbreaks. Since measures such as pesticide application are unnecessary when there is no danger of harmful insects, agricultural production costs can be reduced.

By providing the system of the present invention in home gardens, public parks, and the like, the end-user can monitor the amount of infestation of mosquitoes or other harmful insects through the Internet in real time. Further, since the system simultaneously kills harmful insects with electric shock, the end-user can monitor insect infestation as the insects are exterminated over time, going outdoors to work or the like after confirming that insect infestation has been reduced to a sufficient level. If the insects cannot be sufficiently exterminated, it is possible to install more pulse counters or use the pulse counters in combination with extermination by chemical means to achieve effective pest control or extermination.

The number of mosquitoes or other harmful insects that have been killed in a public park or other outdoor space can be displayed on a Web page at fixed intervals using maps and graphs so that the end-user can confirm in real time which regions are infested with mosquitoes or other harmful insects. This data can help the end-user to select an appropriate campsite, picnic location, or the like.

Further, since an electromagnetic field generated by an electric pulse in the insect electrocutor grows abruptly weaker as the distance from the electrocutor grows, other insect electrocutors installed nearby are not affected by this electromagnetic field. Further, it is possible to use an insect attracting unit for attracting specific insects in each insect electrocutor in order to count only those specific insects.

Further, by connecting a plurality of counter modules, each of which has a different insect attracting unit, to the same field server, different types of insects present in the same area can be counted simultaneously.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

In the drawings.

Figure 1:
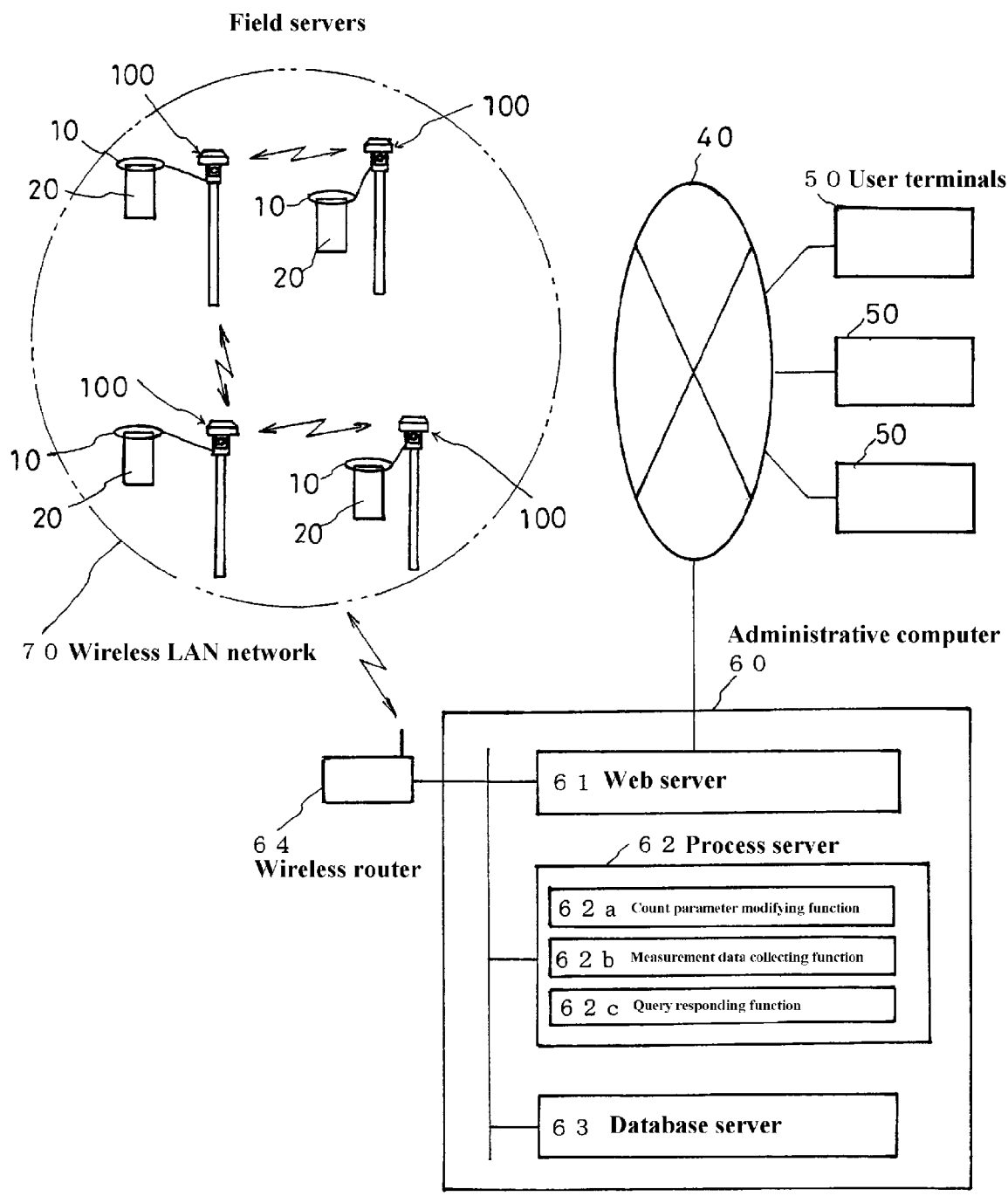
FIG. 1 is an explanatory diagram conceptually illustrating the structure of a pulse counter for counting electric pulses using field servers according to a preferred embodiment of the present invention.

DESCRIPTION OF THE REFERENCE NUMERALS 2 interface unit
3 central controller
3a pulse number storing function
3b pulse data transmitting function
3c pulse resetting function
3d count parameter modifying function
4 storage unit
5 Web server
6 wireless LAN (local area network) transceiver
10 electromagnetic detection coil
20 insect electrocutor
21 counter module
22 case
22a openings
23 insect attracting unit
24 electrodes
25 fan
25a airflow
30 AC signal converter circuit
30a lead wire
30b input terminal
30c op-amp
30d percolator
30e digital filter
30g inverters
30f photo relay
40 internet
50 user terminal
60 administrative computer
61 Web server
62 process server
62a count parameter modifying function
62b measurement data collecting function
62c query responding function
63 database server
64 wireless router
70 wireless LAN (local area network)
100 field server
101 center pole

DESCRIPTION OF THE PREFERRED EMBODIMENTS

FIG. 1 is an explanatory diagram conceptually illustrating the structure of a pulse counter for counting electric pulses using field servers 100 according to a preferred embodiment of the present invention.

The pulse counter is configured of one or a plurality of field servers 100 connected to a wireless LAN network 70, an internet 40, an administrative computer 60 operated by an administrator in charge of managing the field servers 100, and user terminals 50 connected to the internet 40.

An insect electrocutor 20 is positioned near each of the field servers 100 for attracting insects present in the agricultural region and killing them by electrical discharge between electrodes to which a high voltage is applied. An electromagnetic detection coil 10 is disposed above or around the insect electrocutor 20 for detecting changes in the electromagnetic field caused by electrical discharges. An AC signal converter circuit 30 (see FIG. 2) is disposed in each field server 100 and has an input terminal 30b for connecting the lead wire 30a.

The administrative computer 60 is connected to the field servers 100 through a wireless router 64. The administrative computer 60 includes at least a Web server 61, a process server 62, and a database server 63.

The process server 62 is provided with at least a count parameter modifying function 62a, a measurement data collecting function 62b, and a query responding function 62c.

The user terminals 50 connected to the internet 40 are operated by end-users of data, such as agricultural administrators and researchers.

Figure 2:
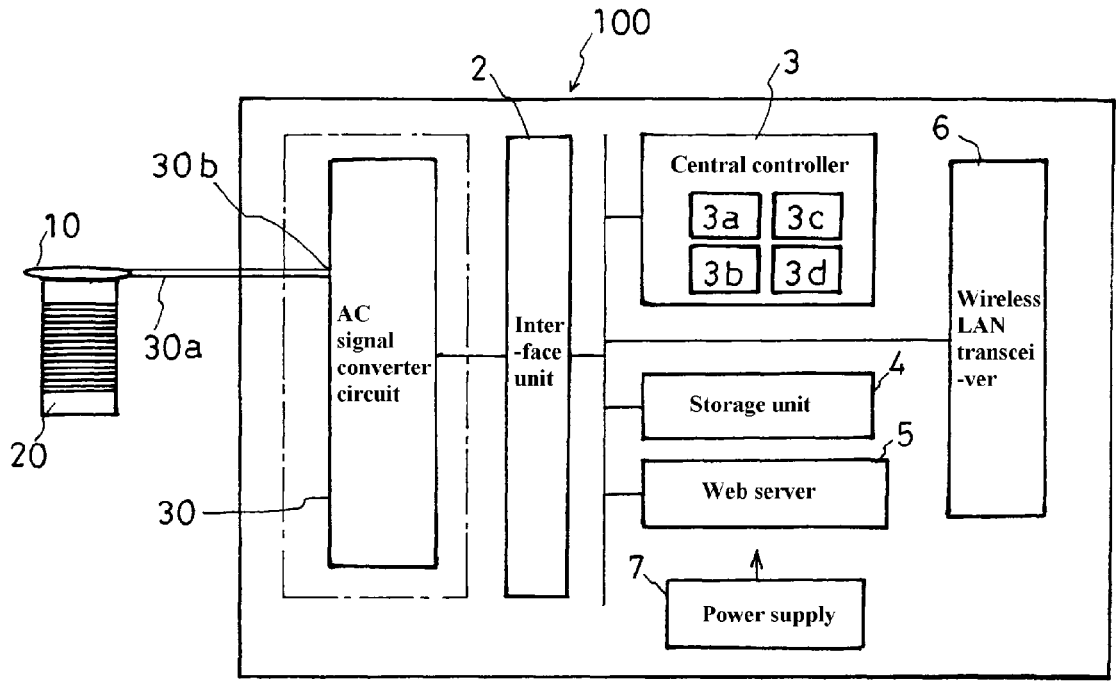
FIG. 2 is a block diagram of a field server connected to an electromagnetic detection coil.

Next, the structure of each field server 100 and the manner in which the field server 100 is connected to the electromagnetic detection coil 10 will be described with reference to FIG. 2. FIG. 2 is a block diagram illustrating the structure of the field server 100 connected to the electromagnetic detection coil 10.

The field server 100 shown in FIG. 2 is configured of at least an interface unit 2, a central controller 3, a storage unit 4, a Web server 5, a wireless LAN transceiver 6, the AC signal converter circuit 30 connected to the lead wire 30a of the electromagnetic detection coil 10 for generating a count pulse by amplifying the AC signal produced in the electromagnetic detection coil 10, and a power supply 7 for supplying power to each component of the field server 100.

The central controller 3 includes at least a pulse number storing function 3a, a pulse data transmitting function 3b, a pulse resetting function 3c, and a count parameter modifying function 3d.

While the AC signal converter circuit 30 is accommodated in the field server 100 in the preferred embodiment, the AC signal converter circuit 30 may also be accommodated in a separate case and connected to the interface unit 2 in the field server 100.

The insect electrocutor 20 includes electrodes to which a high voltage is applied. When an insect or the like comes between the electrodes, the electrodes discharge electricity, producing an electric pulse.

This electrical discharge causes a change in the electromagnetic field. The change in the electromagnetic field excites the electromagnetic detection coil 10, which inputs a high-frequency voltage into the AC signal converter circuit 30 via the lead wire 30a.

The AC signal converter circuit 30 amplifies the high-frequency voltage, converts the voltage to a digital signal, combines pulses inputted within a prescribed interval to form a count pulse, and outputs this count pulse to the interface unit 2 of the field server 100.

The interface unit 2 outputs a count pulse to the central controller 3. The pulse number storing function 3a of the central controller 3 accumulates the number of pulses in the storage unit 4 for each time interval.

The time interval in which the pulse number is accumulated is preset as a parameter of the pulse number storing function 3a to one or two hours, for example, from the measurement start time.

When the field server 100 receives a modify parameter command from the administrative computer 60 through the wireless LAN transceiver 6, the count parameter modifying function 3d of the central controller 3 can modify the parameter of the pulse number storing function 3a for the time interval in which the count pulses are accumulated or can modify the parameter setting in the AC signal converter circuit 30.

Further, if the field server 100 receives a reset command from the administrative computer 60 for clearing the count pulse accumulated thus far, the pulse resetting function 3c resets the accumulated number of count pulses in the storage unit 4 to zero and records the new measurement start time in the storage unit 4.

When the field server 100 receives a count pulse transmission request from the administrative computer 60, the pulse data transmitting function 3b of the central controller 3 transmits the accumulated value of count pulses and the starting and ending times of accumulation stored in the storage unit 4 to the administrative computer 60.

The count parameter modifying function 62a of the process server 62 provided in the administrative computer 60 is a function for transmitting the modify parameter command to the field servers 100 under administrative control. This function is used to set the time interval for accumulating count pulses in the field server 100, noise filtering conditions, and the like.

The measurement data collecting function 62b is a function for transmitting a count pulse transmission request to the field servers 100 under administrative control, receiving the accumulated count pulse stored in the field servers 100, and recording accumulated count pulses for each time interval in the database server 63 in association with each field server 100 or each insect electrocutor 20. The measurement data collecting function 62b also functions to transmit a reset command to the field server 100 from which the accumulated value was read in order to clear the pulse number stored in the storage unit 4 of the respective field server 100.

The query responding function 62c responds to queries from user terminals 50 received by the Web server 61 via the Internet by returning the number of insects killed by each field server 100 in each time interval stored in the database.

The central controller 3 of the field server 100 may also be provided with a function for displaying the count accumulated for each time interval and stored in the storage unit 4 of the field server 100 using a display (not shown) that is connected on-site to the interface unit 2 of the field server 100.

Figure 3:
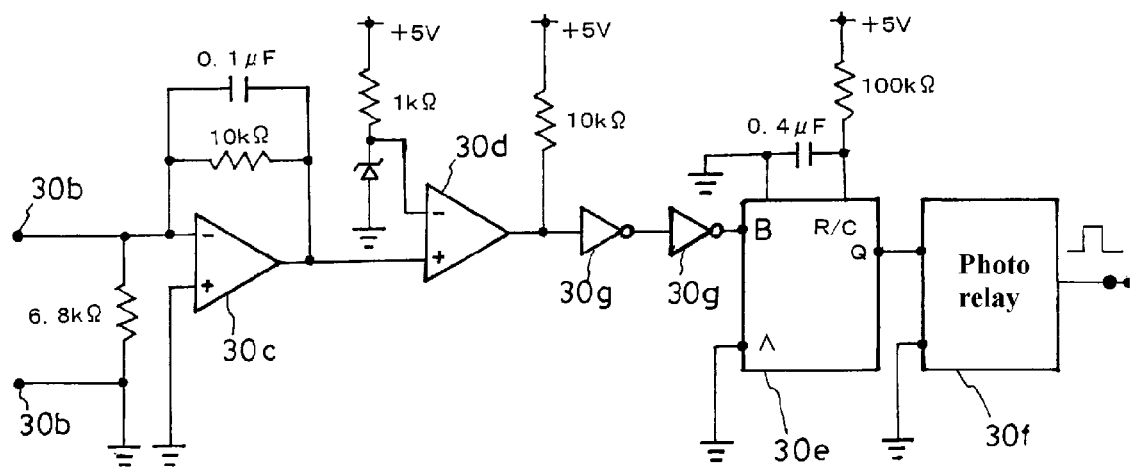
FIG. 3 is a circuit diagram showing an embodiment of an AC signal converter circuit.

FIG. 3 is circuit diagram showing an embodiment of the AC signal converter circuit 30. The AC signal converter circuit 30 of the preferred embodiment is an inexpensive circuit well known in the art configured of common circuit components.

The AC signal converter circuit 30 according to the preferred embodiment includes an op-amp 30c for amplifying the induced voltage in the electromagnetic detection coil 10, a percolator 30d for converting output from the op-amp 30c to a digital signal, and a digital filter 30e (TTL-IC) for generating a count pulse by combining pulses inputted within a prescribed interval set according to the value of resistors and a capacitor connected to the digital filter 30e and for filtering spark noise produced within the prescribed interval.

Since various electromagnetic waves may be induced in the electromagnetic detection coil 10 due to ambient radio waves from cell phones or the like, the electromagnetic detection coil 10 is configured with a diameter of 10-15 centimeters and a suitable number of windings for detecting and outputting only electrical pulses produced in the insect electrocutor 20.

The pulse counter of the preferred embodiment described above uses common inexpensive insect electrocutors that are commercially available. Next, a preferred embodiment of a counter module will be described in which an insect electrocutor, an insect attractor, and an electromagnetic detection coil are accommodated in a rainproof case.

Figure 4:
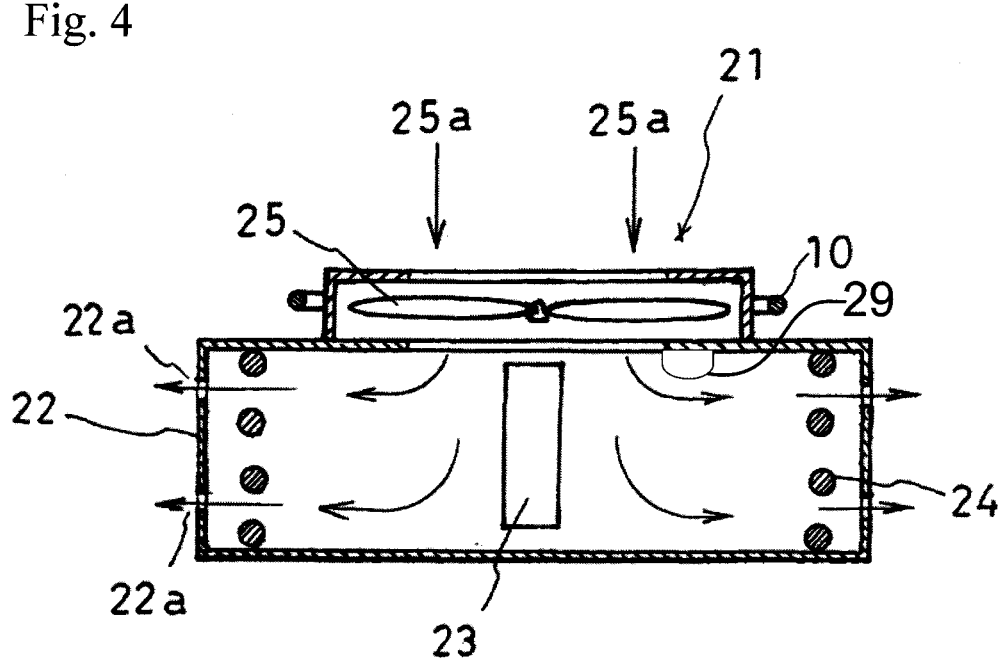
FIG. 4 is a cross-sectional view showing an embodiment of a counter module according to another embodiment of the present invention.

FIG. 4 is a cross-sectional view of a counter module 21 according to the preferred embodiment.

The counter module 21 includes a case 22 having small openings 22a through which insects can enter. The case 22 accommodates an insect attracting unit 23 for attracting insects into the case 22, and electrodes 24 for killing the insects with electric shock. On top of the case 22 are provided a fan 25 for blowing air into the case 22, and an electromagnetic detection coil 10 for detecting sparks produced by electric shock.

The insect attracting unit 23 incorporates pheromones, gas, or a conventional light source emitting light of a specific wavelength, each of which is designed to attract specific types of insects such as mosquitoes. Alternatively, the present system may employ gas or a light source emitting light of a specific wavelength that are found to have a repelling effect on certain insects.

If the counter module 21 is mounted on the field server 100, a fan built into the field server 100 may be used in place of the fan 25 to draw air into the counter module 21. In this case, the counter module 21 shown in FIG. 4 is inverted and mounted on top of the field server 100. An airflow 25a exhausted from the field server 100 is introduced into the counter module 21 and subsequently discharged from the case 22 through the openings 22a.

The airflow 25a passing through the counter module 21 carries attractant pheromones or gas molecules produced by the insect attracting unit 23 outside the counter module 21 to aid in attracting insects. When a repelling gas is used, the airflow 25a can actively emit such gas from the counter module 21 to prevent harmful insects from coming near crops, people, livestock, or the like in the vicinity.

By temporarily accelerating the rotation of the fan 25, a larger airflow 25a can be produced for discharging insects in the insect electrocutor that have been seared by electrical shock and caked on the surface of the electrodes 24 or insect remains and dust accumulating on the insect attracting unit 23 and on the inside bottom surface of the counter module 21. The airflow 25a ejected from the case 22 can also prevent rain from entering the counter module 21, preventing short circuits from occurring in the insect electrocutor due to raindrops.

Figure 5:
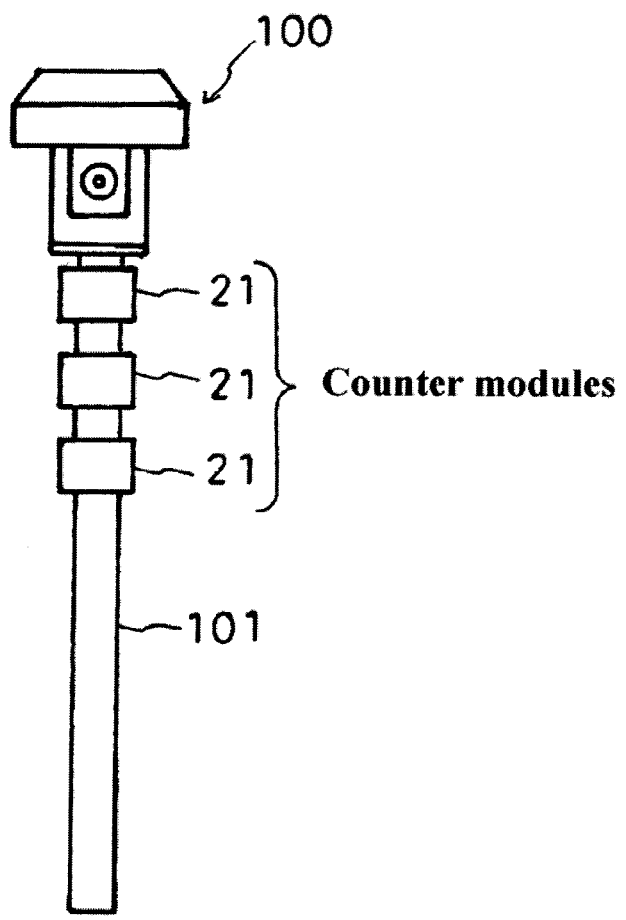
FIG. 5 is an explanatory diagram illustrating how counter modules are mounted on a field server.

FIG. 5 is an explanatory diagram showing a plurality of counter modules mounted on the field server 100. In the preferred embodiment, three counter modules 21 are mounted on a center pole 101 of the field server 100.

Figure 6:
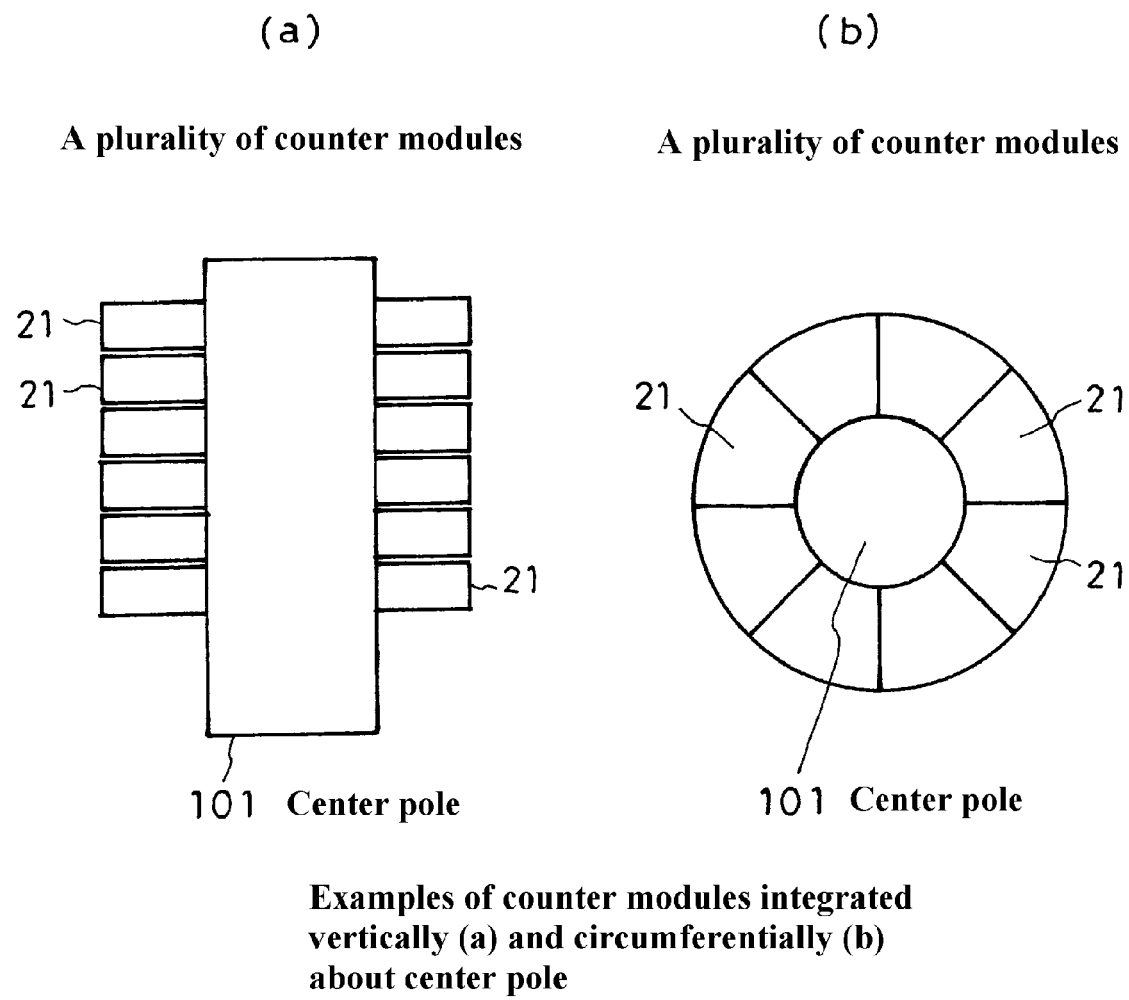
FIG. 6 is an explanatory diagram showing a plurality of counter modules integrated vertically (a) and circumferentially (b).

FIG. 6(*a*) shows a plurality of counter modules juxtaposed vertically on the center pole 101, while FIG. 6(*b*) shows a plurality of counter modules arranged circumferentially around the center pole 101.

In FIG. 6(*a*), the counter modules 21 have a cylindrical doughnut shape, allowing the center pole 101 to be inserted through the center holes thereof. In FIG. 6(*b*), eight wedge-shaped counter modules 21 of equal size are integrated to form a single cylindrical shape that can be mounted on the center pole 101.

By providing a different attractant pheromone or gas in the insect attracting unit 23 of each counter module 21, the plurality of counter modules 21 can function to simultaneously capture and count different types of insects.

When a plurality of counter modules 21 is disposed in the same location in this way, the field server 100 is provided with at least one serial communication port. The interface unit 2 in the field server 100 employs RS-232C or a similar serial communication method. Each of the counter modules 21 and a GPS instrument or other measuring instrument equipped with a serial communication port are connected to the serial communication port of the field server 100 in parallel or through a connection switch. The field server 100 transmits commands to the counter modules 21 and the other instruments to control and receive responses from the same. Hence, this simple field server can be used to collect data effectively by acquiring electric count pulses from the counter modules 21 and data from other instruments.

A small camera 29 capable of communicating with the field server 100 can be provided in the insect electrocutor for taking images of electrocuted insects that have accumulated on the inside bottom surface of the counter module 21 or on the surfaces of the electrodes to aid in monitoring the numbers and types of insects that have been killed.

In this way, if field servers 100 are installed at a plurality of remote locations, the user can verify and correct counts for the number of insects killed by monitoring the small cameras, without having to travel to the remote locations, thereby greatly reducing observation costs.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

What is claimed is:

1. An electric pulse counter employing a field server, the field server comprising:

an environment measuring unit for measuring environmental factors in an agricultural region;

an interface unit for interfacing with the environment measuring unit;

a central controller comprising a microcomputer for reading measurements from the environment measuring unit via the interface unit;

a storage unit for storing the measurements;

a Web server for communication with an administrative computer;

a wireless LAN transceiver utilized for the communication between the Web server and the administrative computer; and a solar cell or commercial power supply input terminal utilized for supplying power to each component of the field server;

wherein the electric pulse counter comprises:

an insect electrocutor having electrodes to which a high voltage is applied and adapted to be provided in an agricultural region for attracting insects present in the agricultural region between the electrodes, and for killing the insects with sparks generated by electrical discharge between the electrodes when the insects enter a gap between the electrodes;

an electromagnetic detection coil disposed near the insect electrocutor for detecting an electromagnetic field radiated by the spark produced from electrical discharge; and an AC signal converter circuit connected to a lead wire of the electromagnetic detection coil for amplifying a high-frequency voltage produced by excitation in the electromagnetic field detection coil, producing a count pulse by converting the high-frequency voltage to a digital signal and filtering noise therefrom, and outputting the count pulse to the interface unit of the field server;

and wherein the central controller comprises:

count pulse number storing means for reading an output signal from the AC signal converter circuit converted to the count pulse via the interface unit beginning from a prescribed accumulation start time and recording the number of count pulses within a prescribed interval in the storage unit for each interval;

count pulse data transmitting means for transmitting an accumulated value of count pulses and starting and ending times of the prescribed interval stored in the storage unit when a count pulse transmission request command is received from the administrative computer via the Web server in the field server; and count pulse resetting means for resetting the accumulated value of count pulses stored in the storage unit to zero and recording a new accumulation start time in the storage unit when a count pulse reset command is received from the administrative computer.

2. The electric pulse counter employing a field server according to claim 1, wherein the central controller further comprises count parameter modifying means for modifying a condition for filtering pulse noise, a time interval for accumulating a number of pulses, and other conditions when a parameter modification command is received from the administrative computer for updating parameters for the AC signal converter circuit or the count pulse number storing means.

3. The electric pulse counter employing a field server according to claim 1, wherein the insect electrocutor comprises an insect attracting unit for emitting a pheromone to attract specific insects present in an agricultural region or an attractant gas including carbon dioxide for attracting mosquitoes or other specific insects; for turning on or flashing light having a specific wavelength; or for outputting ultrasonic waves or sound of another frequency; and counts the number of the specific insects captured.

4. The electric pulse counter employing a field server according to claim 3, wherein the electric pulse counter forms a counter module for preventing insects other than the specific insects targeted for attraction from entering the counter module;

the insect electrocutor comprising:

a rainproof case having a plurality of small holes through which the attracted insects can enter the counter module; and provided in the case: the insect attracting unit; the electrodes to which a high voltage is applied; and the electromagnetic detection coil for detecting an electromagnetic field radiated by a spark produced from electrical discharge between the electrodes.

5. The electric pulse counter employing a field server according to claim 4, further comprising a fan disposed the field server or attached to the counter module for introducing air into the case of the counter module and producing airflows through the counter module, exiting via small holes formed therein for actively carrying molecules of the pheromone or the attractant gas produced by the insect attracting unit out of the counter module to encourage insect attraction;

wherein the fan rotation can be temporarily accelerated to increase the rate of airflow for discharging insects from the insect electrocutor that have been seared by electrical shock and caked on the surfaces of the electrodes or insect remains and dust accumulating on the insect attracting unit and on the inner bottom surface of the counter module;

wherein the airflows produced by the fan also function to prevent rain from entering the counter module and preventing short circuits caused by raindrops from occurring in the insect electrocutor.

6. The electric pulse counter employing a field server according to claim 4, the electric pulse counter integrally comprising a plurality of the counter modules, the insect attracting unit of each counter module having a different type of pheromone, or a source of gas including carbon dioxide, or a light source producing light of a different specific wavelength including yellow light and green light, the pulse counter functioning to count the number of captured insects simultaneously for a plurality of types of insects.

7. The electric pulse counter employing a field server according to claim 4, wherein the field server comprises at least one serial communication port;

the interface unit in the field server employs RS-232C, 12C or a similar serial communication method;

the counter modules and a measuring instruments including a GPS instrument, contained in the environment measuring unit, each equipped with a serial communication port are connected to the serial communication port of the field server in parallel or through a connection switch; and the field server transmits commands to the counter modules and the measuring instruments to control the counter modules and the measuring instruments and to acquire an electric pulse count from the counter modules and data from the other measuring instruments.

8. The electric pulse counter employing a field server according to claim 4, wherein a small camera capable of communicating with the field server is provided in the insect electrocutor for taking images of electrocuted insects that have accumulated on an inner bottom surface of the counter module or on a surface of each of the electrodes to aid in monitoring the numbers and types of insects that have been killed in order to confirm, correct, or compensate for the precision of pulse counts measured with the electric pulse counter.

9. The electric pulse counter employing a field server according to claim 1, for simultaneously measuring numbers of targeted insects and environmental conditions including temperature, humidity, solar radiation, carbon dioxide levels, soil moisture and temperature, and wind; for simultaneously displaying this data together with conditions used for attracting insects, including the type of pheromone, light wavelengths and flashing conditions, and sound frequencies, on a Web page using maps, graphs, or charts; and for publishing this data on the Web page through the Internet.

* * * * *